(12) United States Patent
Ota

(10) Patent No.: US 10,318,056 B2
(45) Date of Patent: Jun. 11, 2019

(54) ELECTRONIC APPARATUS AND METHOD FOR CONTROLLING THE SAME

(71) Applicant: CANON KABUSHIKI KAISHA, Tokyo (JP)

(72) Inventor: Tomohiro Ota, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/587,133

(22) Filed: May 4, 2017

(65) Prior Publication Data

US 2017/0351372 A1 Dec. 7, 2017

(30) Foreign Application Priority Data

Jun. 1, 2016 (JP) .................................. 2016-110042

(51) Int. Cl.
| | |
|---|---|
| *G06F 3/044* | (2006.01) |
| *G06F 3/041* | (2006.01) |
| *G06F 3/0488* | (2013.01) |
| *G11B 27/00* | (2006.01) |
| *G06F 16/00* | (2019.01) |

(52) U.S. Cl.
CPC ............ *G06F 3/0416* (2013.01); *G06F 3/044* (2013.01); *G06F 3/0488* (2013.01); *G06F 16/00* (2019.01); *G11B 27/00* (2013.01); *G06F 2203/04105* (2013.01)

(58) Field of Classification Search
CPC ......... G06F 2203/04105; G06F 3/0416; G06F 3/044

USPC .................................................. 345/170–176
See application file for complete search history.

(56) References Cited

U.S. PATENT DOCUMENTS

| | | | | |
|---|---|---|---|---|
| 9,030,419 | B1 * | 5/2015 | Freed .................... | G06F 3/0416 345/156 |
| 2009/0002199 | A1 * | 1/2009 | Lainonen .............. | G06F 3/0414 341/20 |
| 2009/0267902 | A1 * | 10/2009 | Nambu ................... | G06F 3/016 345/173 |
| 2011/0050653 | A1 * | 3/2011 | Miyazawa ............ | G06F 3/0482 345/179 |
| 2011/0291976 | A1 * | 12/2011 | Takada .................... | G06F 3/016 345/173 |
| 2013/0332892 | A1 * | 12/2013 | Matsuki ................ | G06F 3/0488 715/863 |
| 2014/0028591 | A1 * | 1/2014 | Kanda ................... | G06F 3/0416 345/173 |
| 2014/0359438 | A1 * | 12/2014 | Matsuki ................... | G02B 7/36 715/702 |

(Continued)

FOREIGN PATENT DOCUMENTS

| | | |
|---|---|---|
| JP | 2013-196446 A | 9/2013 |
| JP | 2015-519655 A | 7/2015 |

*Primary Examiner* — Tony O Davis

(74) *Attorney, Agent, or Firm* — Canon USA Inc., IP Division

(57) ABSTRACT

Upon detection of a touch operation, an intensity of the touch is detected to calculate a provisional value of the touch intensity, and a video image to which a visual effect based on the provisional value is applied is displayed. Upon detection of removal of the touch, a definite value of the touch intensity is calculated and a confirmation screen for confirming whether to apply a visual effect based on the definite value is displayed.

29 Claims, 10 Drawing Sheets

(56) References Cited

U.S. PATENT DOCUMENTS

| | | | | |
|---|---|---|---|---|
| 2015/0160729 A1* | 6/2015 | Nakagawa | .............. | G06F 3/016 |
| | | | | 345/173 |
| 2015/0192997 A1* | 7/2015 | Nakagawa | .............. | G06F 3/016 |
| | | | | 345/174 |
| 2015/0192998 A1* | 7/2015 | Ishimaru | ................. | G06F 3/016 |
| | | | | 345/174 |
| 2015/0265190 A1* | 9/2015 | Ikebe | ..................... | A61B 5/021 |
| | | | | 600/316 |
| 2015/0277564 A1* | 10/2015 | Saito | .................... | G06F 3/0485 |
| | | | | 715/702 |
| 2015/0331394 A1* | 11/2015 | Jang | ....................... | G04G 21/08 |
| | | | | 368/281 |
| 2017/0300215 A1* | 10/2017 | Nakahama | .......... | G06F 3/04845 |
| 2017/0351372 A1* | 12/2017 | Ota | ....................... | G06F 3/0416 |

\* cited by examiner

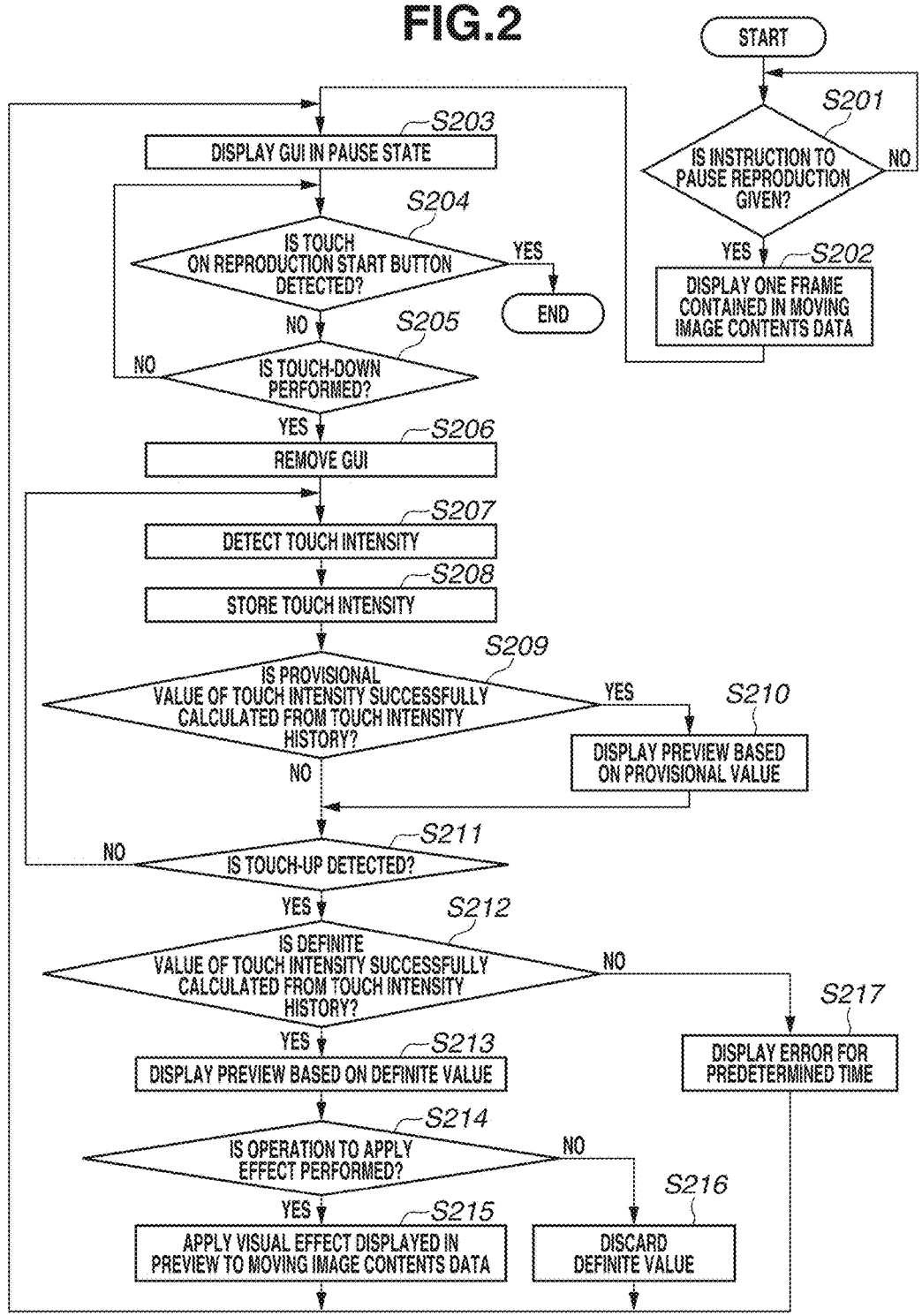

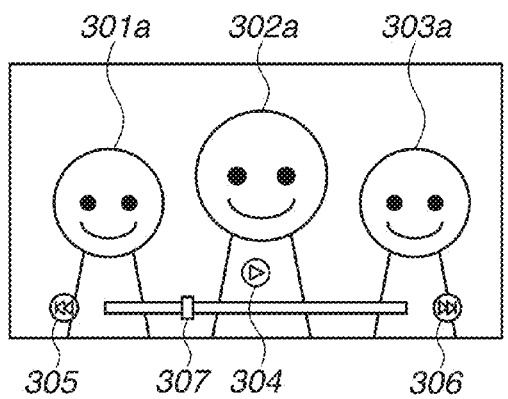
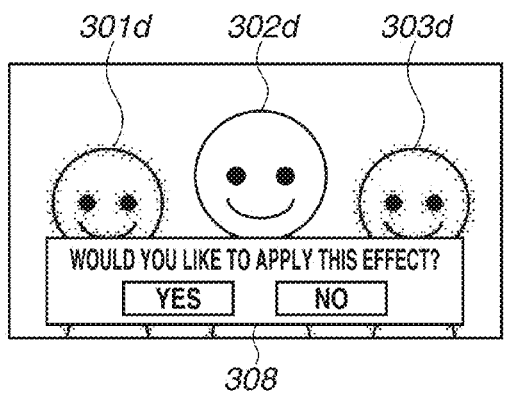
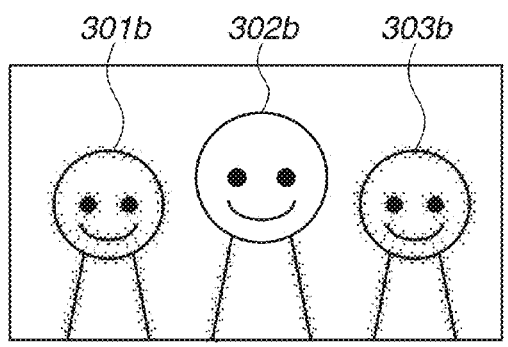
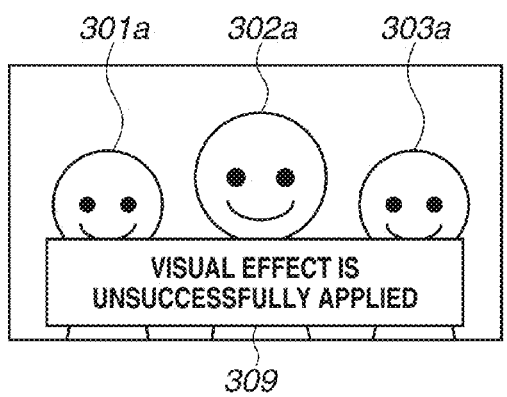
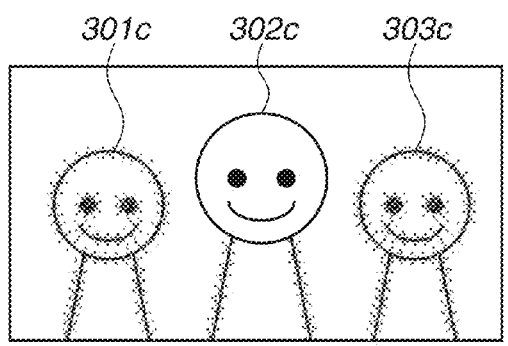

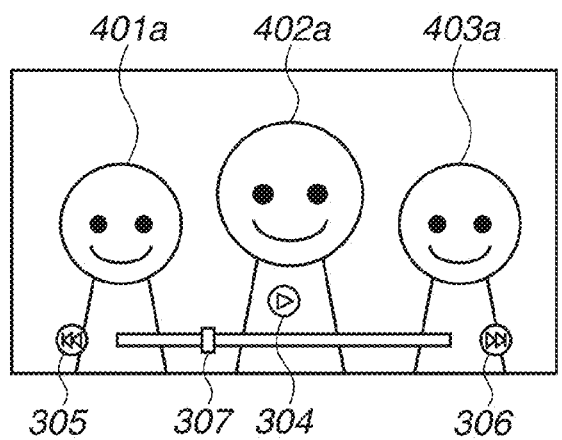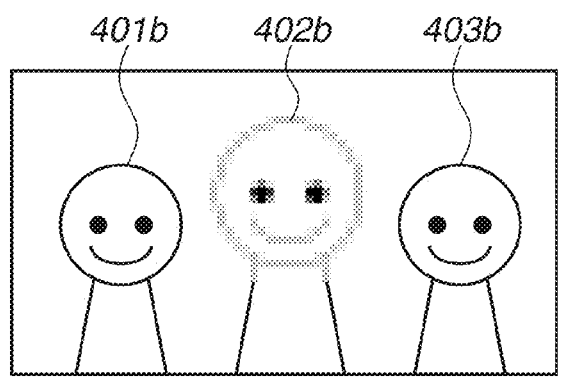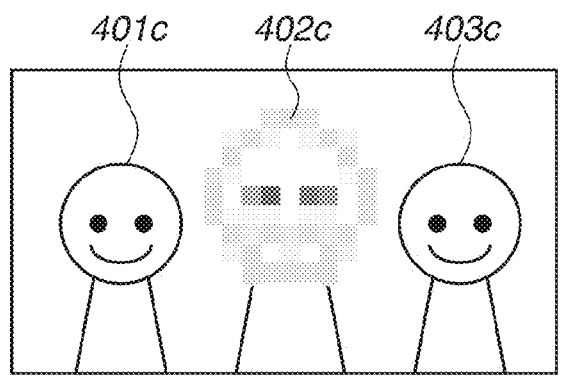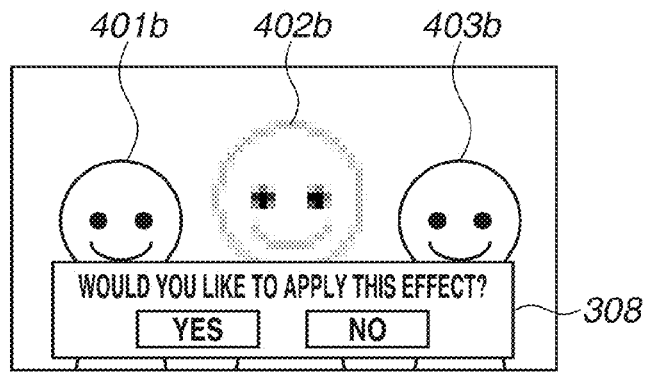

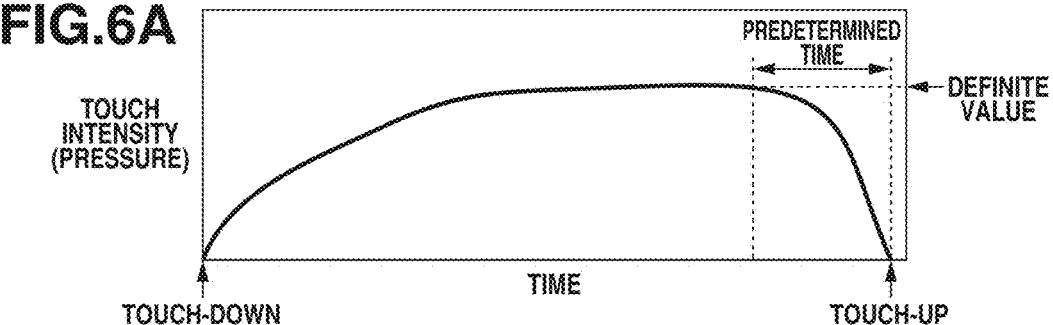
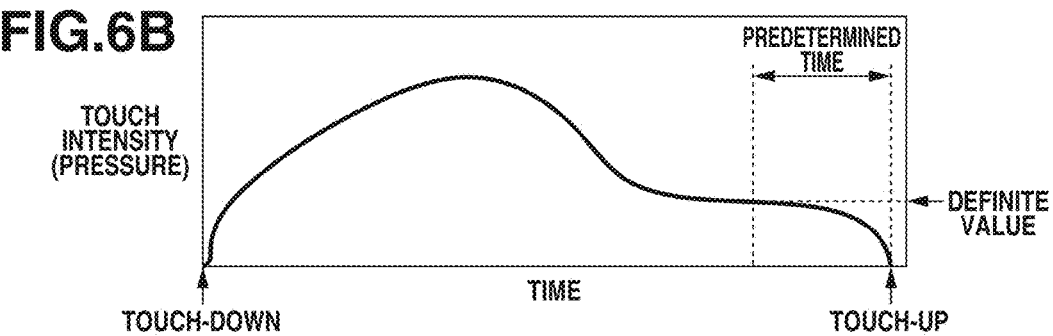
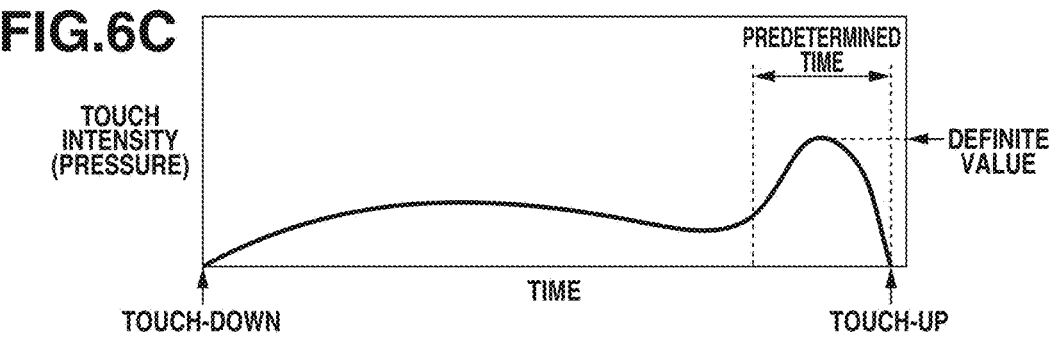
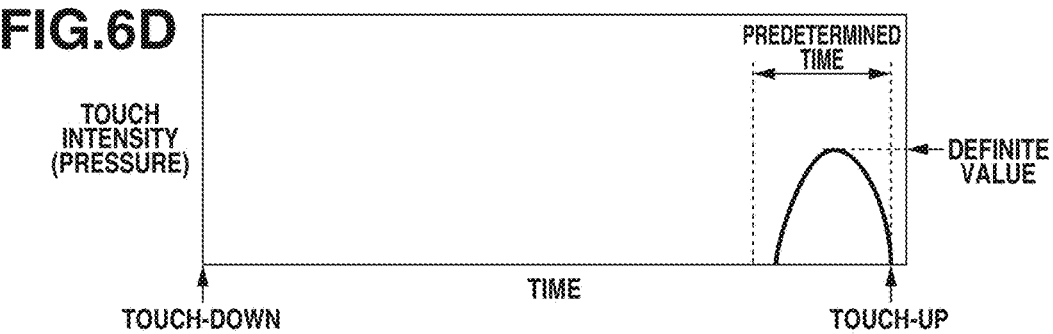

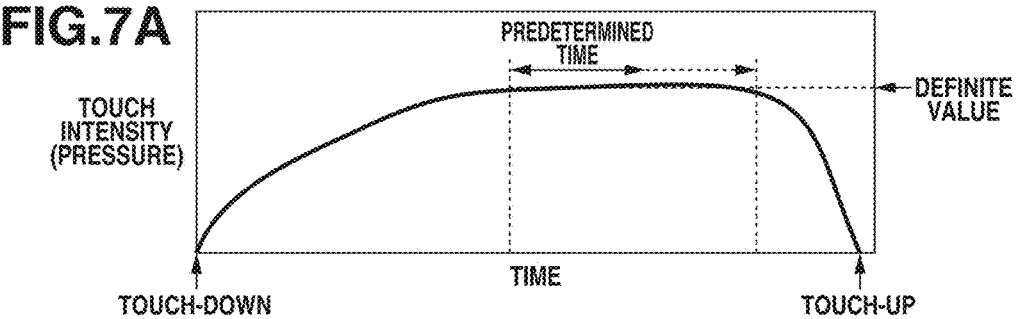
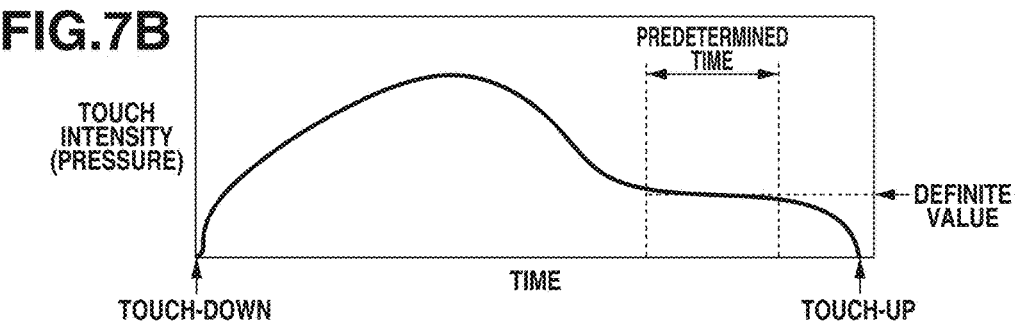
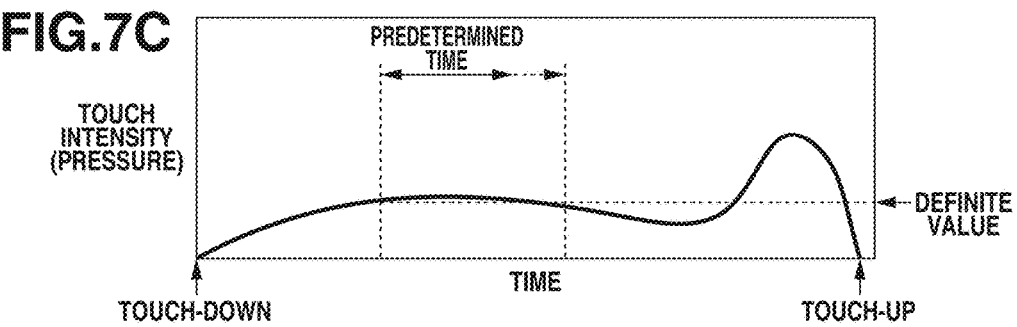
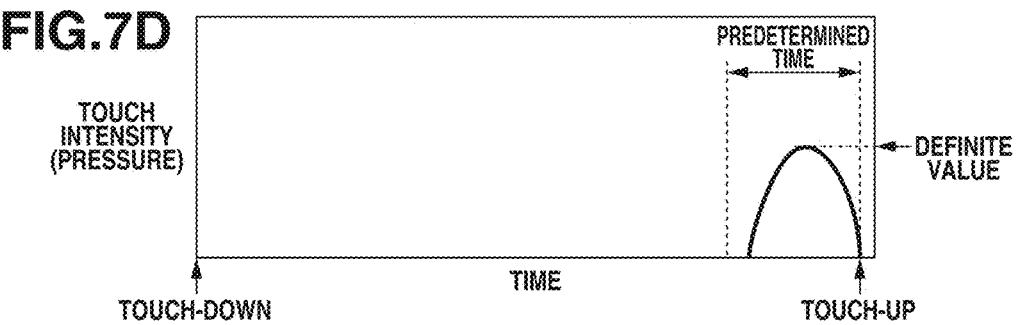

ELECTRONIC APPARATUS AND METHOD FOR CONTROLLING THE SAME

BACKGROUND

Field

The present disclosure relates to a technique for use in an electronic apparatus that detects an intensity of contact onto an operation surface, a method for controlling the electronic apparatus, and a storage medium.

Description of the Related Art

Many conventional electronic apparatuses include a touch panel for receiving input of user operations. In recent years, a touch panel that detects a contact intensity of a finger or stylus at a plurality of levels has been used as a user interface.

Japanese Patent Application Laid-Open No. 2013-196446 discusses a method for determining an applied pressure based on a maximum value of a signal waveform acquired from input to a pressure calculation apparatus, which is capable of calculating a pressure applied to an input surface of a substrate by contact with the input surface, regardless of an input means. Japanese Patent Application Laid-Open No. 2015-519655 discusses a user interface that displays a preview of a new state in response to an initial portion of pressed input and thereafter determines whether to return to a previous state or change to the new state at the end of the input, thereby reducing the burden of recognition on the user.

If an electronic apparatus that detects an intensity of contact onto a touch panel can execute different processing according to a touch intensity applied by a user, such an electronic apparatus can be utilized in various applications.

In order to facilitate operations in an electronic apparatus that detects an intensity of contact onto the touch panel, a process for setting a definite touch intensity is realized by a single-stroke touch operation (an operation to press down by a single touch) without requiring a combination with another operation. There are various forms of user touch operations, and after the user adjusts a level of a contact intensity during a single-stroke touch operation, an intended touch intensity (adjusted contact intensity) needs to be set as a definite touch intensity.

In the method discussed in Japanese Patent Application Laid-Open No. 2013-196446, the maximum value of the pressure applied by a touch operation is determined as a user-intended touch intensity. Thus, when the user adjusts the level of the contact intensity during the single-stroke touch operation, processing that is not intended by the user can be selected. With the method discussed in Japanese Patent Application Laid-Open No. 2015-519655, the touch intensity is determined only at two levels, so that when a strong touch operation is performed, definite processing is set at this time point. Thus, when the user adjusts the level of the contact intensity during the single-stroke touch operation, processing that is not intended by the user can be selected.

SUMMARY

Embodiments are directed to a technique for enabling execution of user-intended processing in an apparatus that executes different processing according to a touch intensity in a case where the user adjusts the level of a contact intensity during a touch operation.

According to an aspect of the present disclosure, an electronic apparatus includes a touch detection unit configured to detect a touch operation performed on an operation surface, a pressure detection unit configured to detect a pressing force applied to the operation surface, and a control unit configured to perform control in such a manner that in a case where removal of a touch from the operation surface is detected by the touch detection unit, processing is performed based on the pressing force detected by the pressure detection unit at a time point preceding a time point of the detection of the removal of the touch by at least a predetermined time or a predetermined number of detection cycles of the pressure detection unit.

Further features will become apparent from the following description of exemplary embodiments with reference to the attached drawings.

BRIEF DESCRIPTION OF THE DRAWINGS

FIG. 2 is a flow chart illustrating an example of a process for applying a visual effect to a moving image based on a touch position according to a first exemplary embodiment.

FIGS. 3A to 3E each illustrate an example of a screen arrangement displayed on a display according to the first exemplary embodiment.

FIGS. 4A to 4D each illustrate another example of a screen arrangement displayed on a display according to the first exemplary embodiment.

FIGS. 6A to 6D each illustrate another example of a method for calculating provisional and definite values of a touch intensity.

FIGS. 7A to 7D each illustrate another example of a method for calculating provisional and definite values of a touch intensity.

DESCRIPTION OF THE EMBODIMENTS

Various exemplary embodiments will be described in detail below with reference to the drawings.

An example in which an exemplary embodiment is applied to an operation to apply a visual effect to moving image contents data in an electronic apparatus will be described as a first exemplary embodiment.

Figure 1:
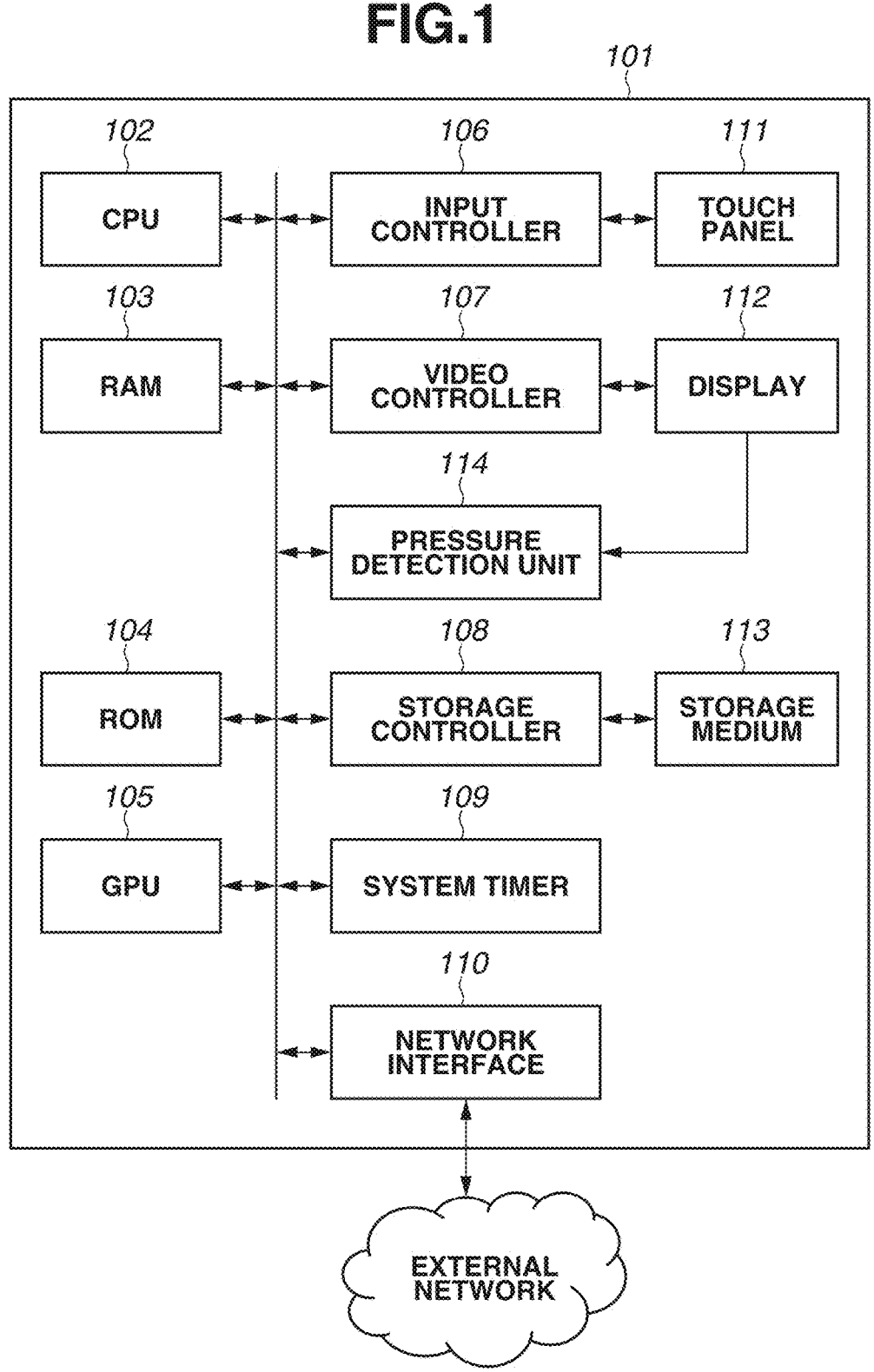
FIG. 1 is a block diagram illustrating an example of a configuration of an electronic apparatus according to an exemplary embodiment.

FIG. 1 is a block diagram illustrating an example of a configuration of an electronic apparatus 101 according to the present exemplary embodiment. The present exemplary embodiment is not limited to the configuration illustrated in FIG. 1. For example, functions realized by a plurality of blocks in the electronic apparatus 101 can be realized by a single application-specific integrated circuit (ASIC). Alternatively, a function of a block can be included in another block. Some of the blocks can be a physically-independent device. In this case, the blocks are connected to each other via a wired or wireless interface.

In FIG. 1, a central processing unit (CPU) 102 controls the blocks in the electronic apparatus 101 based on a program read from a read-only memory (ROM) 104 or a storage medium 113 to perform predetermined processing. The CPU 102 transfers the program and data read from the storage medium 113 to a random access memory (RAM) 103 and then reads the program and the data from the RAM 103 to perform processing. The processed data is stored on the ROM 104 and then output to a predetermined block. A part of the RAM 103 is used as a video RAM (VRAM) for displaying a screen, and the CPU 102 or a graphics processing unit (GPU) 105 performs screen drawing processing using the VRAM.

Basic programs and data for operations of the electronic apparatus 101 are recorded in the ROM 104 and are read directly by the CPU 102. Depending on a configuration, all programs to be used by the CPU 102 can be recorded in the ROM 104.

The GPU 105 performs screen drawing processing using the VRAM in the RAM 103 based on an instruction from the CPU 102. The GPU 105 can include a video acceleration function. In this case, the GPU 105 reproduces a moving image by decoding, without using the CPU 102, the moving image contents data read from the storage medium 113 and then sequentially loading the decoded data frame by frame into the VRAM. In a case where the GPU 105 does not include the video acceleration function, the CPU 102 performs the decoding processing.

The GPU 105 applies various types of visual effects to the moving image contents data read from the storage medium 113. Examples of applicable visual effects include a luminance adjustment, a color adjustment, a sharpness adjustment, a feathering effect, a mosaic effect, a blurring effect, a distortion correction, and an image stabilization. The CPU 102, in place of the GPU 105, can perform processing of applying such visual effects, or the CPU 102 and the GPU 105 can share the processing.

An input controller 106 reads input signals from a touch panel 111, performs processing such as noise cancellation, and then transmits a notification to the CPU 102.

A video controller 107 reads the data stored in the VRAM in the RAM 103 and outputs the data as video image signals to a display 112. The video controller 107 can also output data generated by combining a plurality of pieces of data. For example, the video controller 107 can output data including video image data on which data, such as characters and images, is superimposed by an on-screen display (OSD) function.

A storage controller 108 controls data transfer between the storage medium 113 and other blocks.

A system timer 109 notifies the CPU 102 of a processing timing by interruption. Accordingly, the CPU 102 can perform predetermined processing at the predetermined timing according to the interruption by the system timer 109.

A network interface 110 can connect to an external network, such as the Internet, to transmit and receive data using predetermined protocols.

The display 112 is a display unit to which the video image signals output from the video controller 107 are input and which displays a video image.

The electronic apparatus 101 includes as an operation unit the touch panel 111 that detects contact with the display 112. The touch panel 111 and the display 112 can be integrated. In one example, the touch panel 111 is configured in such a way as to have high light transmittance so as not to disturb a display on the display 112, and the touch panel 111 is mounted on an upper layer of a display surface of the display 112. Input coordinates on the touch panel 111 are associated with display coordinates on the display 112. In this way, a graphical user interface (GUI) that makes a user feel as though the user can directly operate a screen displayed on the display 112 is configured.

The CPU 102 can detect the following operations performed on the touch panel 111 (the following operations performed on the operation surface of the display 112) and detect the following states:

a new touch on the touch panel 111 by a finger or a stylus that was previously not touching the touch panel 111, i.e., a start of a touch (hereinbelow, "touch-down").

a state in which the touch panel 111 is being touched by the finger or the stylus (hereinbelow, "touch-on").

a move of the finger or the stylus while touching the touch panel 111 (hereinbelow, "touch-move").

removal of the finger or the stylus from the touch panel 111, i.e., an end of the touch (hereinbelow, "touch-up").

a state in which nothing is touching the touch panel 111 (hereinbelow, "touch-off").

When the "touch-down" is detected, the "touch-on" is also detected at the same time. Normally, the "touch-on" is continuously detected after the "touch-down" is detected unless the "touch-up" is detected. The "touch-move" is also detected while the "touch-on" is being detected. Even when the "touch-on" is detected, no "touch-move" is detected if a touch position is not moved. After the "touch-up" of all fingers or styluses having touched the touch panel 111 is detected, the "touch-off" is detected.

The CPU 102 is notified, via the input controller 106, of the above-described operations/states and coordinates of the touch position of the finger or the stylus on the touch panel 111. Then, based on the notification information, the CPU 102 determines an operation performed on the touch panel 111. As to the "touch-move", each of vertical and horizontal components of a moving direction of the finger or the stylus moving on the touch panel 111 can be determined based on changes in the position coordinates.

When the "touch-down", the "touch-move" by a certain distance, and then the "touch-up" are performed on the touch panel 111, it is determined that a stroke is drawn. An operation to quickly draw the stroke is referred to as a flick. The flick is an operation to quickly move the finger or the stylus on the touch panel 111 a certain distance with the finger or the stylus touching the touch panel 111 and then removing the finger or the stylus from the touch panel 111, i.e., a quick tracing operation on the touch panel 111 in such a way as to flip the touch panel 111 with the finger or the stylus. When the "touch-move" by a predetermined distance or longer at a predetermined speed or higher is detected followed by detection of the "touch-up", it is determined that the flick is performed. When the "touch-move" by the predetermined distance or longer at a speed lower than the predetermined speed is detected, it is determined that a dragging operation is performed. A touch operation to simultaneously touch a plurality of points (e.g., two points) and then bringing the touch positions close to each other is referred to as "pinch-in", and a touch operation to bring the touch positions away from each other is referred to as "pinch-out". The "pinch-out" and the "pinch-in" are collectively referred to as a "pinch operation", or simply "pinch".

The touch panel 111 can be any one of various types of touch panels, such as resistive film touch panels, capacitive touch panels, surface acoustic wave touch panels, infrared touch panels, electromagnetic inductive touch panels, image recognition touch panels, and optical sensor touch panels. Depending on the type, some detect a touch when contact is made with the touch panel 111 and some detect a touch when a finger or a stylus is brought near the touch panel 111.

A pressure detection unit 114 detects a pressing force (a touch intensity) applied to the operation surface of the display 112. The pressure detection unit 114 continuously detects the intensity of the pressing force when the display 112 is pressed by a touch operation. As to the configuration of the pressure detection unit 114, a distortion gauge sensor can be provided at a portion that is distorted by the pressing force applied to the operation surface of the display 112, and the pressure detection unit 114 can detect the pressing force applied to the operation surface of the display 112 based on an output value from the distortion gauge sensor. Alternatively, a capacitive sensor can be provided parallel to the display 112. With the capacitive sensor, the distance between the finger or stylus on the operation surface of the display 112 and the capacitive sensor, which is changed due to a distortion of the operation surface by the pressing force applied to the operation surface, is calculated from a capacitive value. Then, the pressing force can be calculated based on the distance, or the distance and the pressing force can be treated as equivalents. The pressure detection unit 114 can be any type as long as the pressing force applied to the operation surface of the display 112 can be detected. The pressure detection unit 114 can be integrated with the touch panel 111.

The storage medium 113 stores the programs for causing the CPU 102 to perform processing and the moving image contents data to be processed by the CPU 102. The storage medium 113 can be a built-in flash memory included in the electronic apparatus 101 or an external hard disk drive (HDD), a memory card, a magnetic disk, or an optical disk attached to an interface apparatus (not illustrated) or a drive apparatus (not illustrated) when used. Alternatively, the storage medium 113 can be a server apparatus connected via a network.

FIG. 2 is a flow chart illustrating an example of a process for applying a visual effect to a moving image based on a touch position by the electronic apparatus 101 according to the present exemplary embodiment. The CPU 102 reads the program stored in the ROM 104 or the storage medium 113 into the RAM 103 and controls the components of the electronic apparatus 101 to realize operations specified in the flow chart illustrated in FIG. 2. FIGS. 3A to 3E each illustrate an example of a screen arrangement displayed on the display 112 and will be described together with FIG. 2.

First, when a user operates the touch panel 111 during reproduction of a moving image, the processing is started. Then, in step S201, the CPU 102 stands by until an instruction to pause the reproduction of the moving image contents data read from the storage medium 113 is provided. If the CPU 102 determines that the instruction to pause the reproduction of the moving image contents data is provided (YES in step S202), the processing proceeds to step S202.

In step S202, the CPU 102 decodes one selected moving image frame contained in the moving image contents data, displays the decoded moving image frame on the display 112, and sets the state to a reproduction pause state. Then, in step S203, the GPU 105 superimposes and displays a GUI in the pause state on the moving image frame. FIG. 3A illustrates a screen arrangement displayed at this time.

In FIG. 3A, objects 301a, 302a, and 303a are objects that appear in the moving image. A reproduction start button 304, a backward skip button 305, a forward skip button 306, and a slide bar 307 are GUI elements superimposed and displayed on the moving image frame. When a point on the touch panel 111 corresponding to any one of display positions of the GUI elements is touched, the CPU 102 performs control corresponding to the element in response to the detection of the touch.

Next, in step S204, the CPU 102 determines whether a touch of the user on the reproduction start button 304 is detected. If the CPU 102 determines that a touch on the reproduction start button 304 is detected (YES in step S204), the processing ends. Then, the CPU 102 resumes the reproduction of the moving image.

If the CPU 102 determines that no touch on the reproduction start button 304 is detected (NO in step S204), the processing proceeds to step S205. In step S205, the CPU 102 determines whether a "touch-down" is performed on the moving image frame other than the GUI elements. If the CPU 102 determines that a "touch-down" is performed on the moving image frame other than the GUI elements (YES in step S205), the processing proceeds to step S206. If the CPU 102 determines that no "touch-down" is performed on the moving image frame other than the GUI elements (NO in step S205), the processing returns to step S204.

In step S206, the GPU 105 removes the GUI superimposed and displayed in step S203 from the moving image frame. The removal of the GUI makes a visual effect displayed in a preview during a "touch-on" more visible.

Then, in step S207, the pressure detection unit 114 detects, from the touch panel 111, the touch intensity after the "touch-down" in step S205.

Next, in step S208, the CPU 102 temporarily stores in the RAM 103 information about the touch intensity detected by the pressure detection unit 114 in step S207, and updates a touch intensity history.

Next, in step S209, the CPU 102 determines whether a provisional value of the touch intensity is successfully calculated from the updated touch intensity history in the RAM 103. A method for calculating the provisional value of the touch intensity is described below. If the CPU 102 determines that the provisional value of the touch intensity is successfully calculated (YES in step S209), the processing proceeds to step S210. If the CPU 102 determines that the provisional value of the touch intensity is not successfully calculated (NO in step S209), the processing proceeds to step S211.

In step S210, the GPU 105 displays on the display 112 a preview based on the provisional value calculated in step S209. FIG. 3B illustrates a state in which the preview is displayed when the "touch-on" is performed on a face portion of an object 302b, and FIG. 3C illustrates a state in which the preview is displayed when the "touch-on" is performed on a face portion of an object 302c.

In the examples illustrated in FIGS. 3B and 3C, the feathering effect is applied to a region around the "touch-on" position based on the provisional value. FIG. 3B illustrates an example of a display screen of the preview in a case where the provisional value is relatively small. While a weak feathering effect is applied to a body portion of the object 302b and objects 301b and 303b located near the "touch-on" position, the face portion of the object 302b is displayed sharply. FIG. 3C illustrates an example of a display screen of the preview in a case where the provisional value is relatively large. While a stronger feathering effect than that in the example illustrated in FIG. 3B is applied to a body portion of the object 302c and objects 301c and 303c located near the "touch-on" position, the face portion of the object 302c is displayed sharply. In this state, if a drag operation is performed to drag the object 302b or 302c to another object, for example the object 303b or 303c, an object to be displayed sharply can be changed to the object 303b or 303c.

In step S211, the CPU 102 determines whether a "touch-up" is detected after the detection of the "touch-down" in step S205. If the CPU 102 determines that a "touch-up" is detected (YES in step S211), the processing proceeds to step S212. If the CPU 102 determines that no "touch-up" is detected (NO in step S211), the processing returns to step S207, and the touch intensity is periodically detected.

In step S212, the CPU 102 determines whether a definite value of the touch intensity is successfully calculated, using a similar method to that in step S209. If the CPU 102 determines that the definite value of the touch intensity is successfully calculated (YES in step S212), the processing proceeds to step S213. Depending on a below-described method of calculating the definite value of the touch intensity, there can be a case where the processing always proceeds to step S213.

In step S213, the GPU 105 displays on the display 112 a preview based on the definite value calculated in step S212. At this time, the GPU 105 displays the preview on which a dialog is superimposed as a confirmation screen for confirming the processing. FIG. 3D illustrates an example of the screen arrangement displayed at this time.

In FIG. 3D, objects 301d, 302d, and 303d are objects displayed in the preview based on the definite value calculated in step S212. A confirmation dialog 308 is a dialog for asking the user whether to apply the feathering effect displayed in the preview, and a touch operation can be received via a button displayed within the confirmation dialog 308. At this time, the confirmation dialog 308 can be temporarily removed by performing a "touch-down" on a screen region other than the confirmation dialog 308 to check the visual effect applied to a portion hidden behind the confirmation dialog 308. A "touch-down" can be performed on the screen region other than the confirmation dialog 308 to execute step S207 and the subsequent steps again. The displaying of the preview as described above enables the user to calmly consider whether the user really desires to apply the feathering effect based on the definite value.

Next, in step S214, the CPU 102 determines whether an operation (an execution instruction) to apply the effect is performed on the confirmation dialog 308. Specifically, the CPU 102 determines whether a "touch-down" and a "touch-up" on an icon for applying the effect in the confirmation dialog 308 are detected. If the CPU 102 determines that an operation to apply the effect is performed on the confirmation dialog 308 (YES in step S214), the processing proceeds to step S215.

In step S215, the GPU 105 applies the visual effect displayed in the preview in step S213 to the moving image contents data. At this time, the same visual effect as that displayed in the preview in step S213 can be applied to the entire moving image contents data or can be applied only for a designated period. The object 302d sharply displayed in step S213 can be tracked in previous and subsequent frames so that the object 302d is continuously sharply displayed even if the object 302d is moved. Then, when the processing is completed, the processing returns to step S203.

In step S214, if the CPU 102 determines that an operation to not apply the effect is performed on the confirmation dialog 308 (NO in step S214), the processing proceeds to step S216. In step S216, the CPU 102 discards the definite value calculated in step S212. Then, the processing returns to step S203.

In step S212, if the CPU 102 determines that the definite value of the touch intensity is not successfully calculated (NO in step S212), the processing proceeds to step S217. In step S217, the GPU 105 displays on the display 112 for a predetermined time an error indicating that the definite value of the touch intensity is not successfully calculated. FIG. 3E illustrates an example of a display state at this time. As illustrated in FIG. 3E, the objects 301a, 302a, and 303a are in a state corresponding to the state illustrated in FIG. 3A in which the effect is not yet applied. An error dialog 309 is a dialog indicating that the definite value of the touch intensity is not successfully calculated.

The process illustrated in FIG. 2 is also applicable to a visual effect other than the feathering effect. FIGS. 4A to 4D each illustrate an example of the screen arrangement displayed on the display 112 when a mosaic effect is applied to an object on which a "touch-on" is performed. Elements similar to those in FIGS. 3A to 3E are provided with the same reference numerals.

FIG. 4A illustrates an example of the screen arrangement in a corresponding state to FIG. 3A, and objects 401a, 402a, and 403a are objects that appear in the moving image.

FIG. 4B illustrates an example of the screen arrangement in a corresponding state to FIG. 3B, and a mosaic effect of relatively small blocks is applied to a face portion of an object 402b on which a "touch-on" is performed. The mosaic effect is not applied to objects 401b and 403b, because the objects 401b and 403b are positioned apart from the object 402b.

FIG. 4C illustrates an example of the screen arrangement in a corresponding state to FIG. 3C, and a mosaic effect of relatively large blocks is applied to a face portion of an object 402c on which a "touch-on" is performed. The mosaic effect is not applied to objects 401c and 403c, because the objects 401c and 403c are positioned apart from the object 402c.

FIG. 4D illustrates an example of the screen arrangement in a corresponding state to FIG. 3D, and the mosaic effect based on the definite value is applied and the confirmation dialog 308 is displayed.

FIGS. 5A to 5D, 6A to 6D, and 7A to 7D illustrate the methods of calculating the provisional value and the definite value in steps S209 and S212, respectively, in FIG. 2. There are three types of possible calculation methods, and FIGS. 5A to 5D, 6A to 6D, and 7A to 7D respectively correspond to the three methods. In each one of FIGS. 5A to 5D, 6A to 6D, and 7A to 7D, a horizontal axis represents the passing of time and a vertical axis represents the touch intensity detected by the pressure detection unit 114. FIGS. 5A to 5D, 6A to 6D, and 7A to 7D each illustrate one of four patterns of a change in touch intensity from the "touch-down" detection in step S205 to the "touch-up" detection in step S211. At the moments of the "touch-on" and the "touch-up" in all of FIGS. 5A to 5D, 6A to 6D, and 7A to 7D, the touch intensity is zero. The time is measured with the system timer 109.

FIGS. 5A to 5D illustrate a method for determining, as the definite value, the touch intensity at a time point preceding a time point of occurrence of the "touch-up" by a predetermined time or by a predetermined number of times of detection/a predetermined number of detection cycles.

Figure 5A:
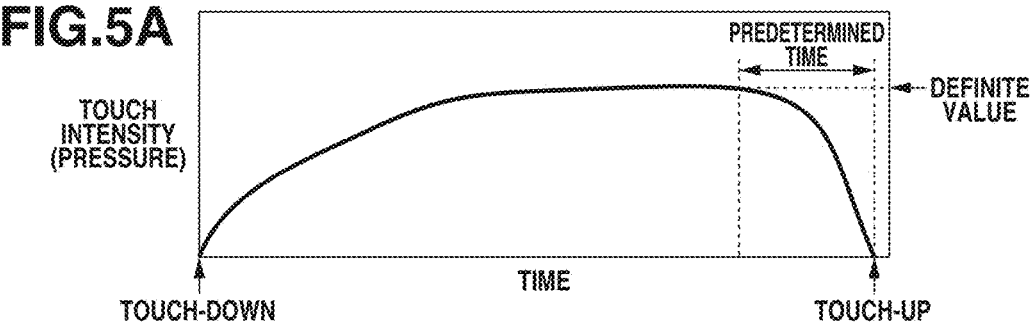
FIGS. 5A to 5D each illustrate an example of a method for calculating provisional and definite values of a touch intensity.

FIG. 5A illustrates a case where a curve of the touch intensity is directed toward the "touch-up" gradually from a maximum point of the touch intensity. In this case, the predetermined time is set as appropriate to determine as the definite value a stable touch intensity before the curve is directed toward the "touch-up".

Figure 5B:
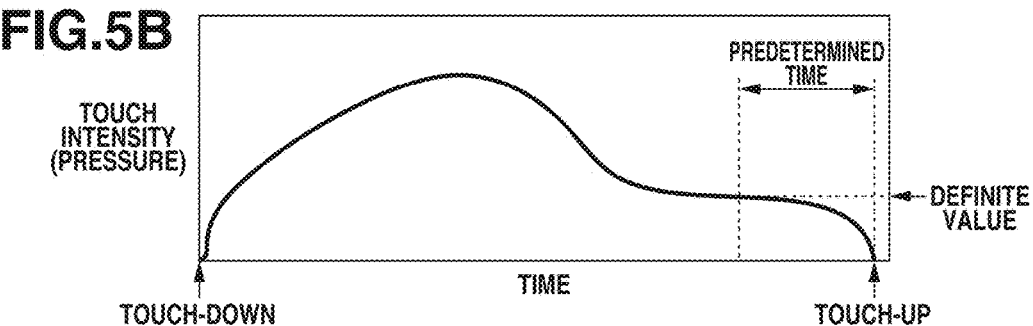

FIG. 5B illustrates a case where after one strong touch is performed, the touch intensity is adjusted to a weaker value, and then the "touch-up" is performed. In this case, the intended weaker value is determined as the definite value.

Figure 5C:
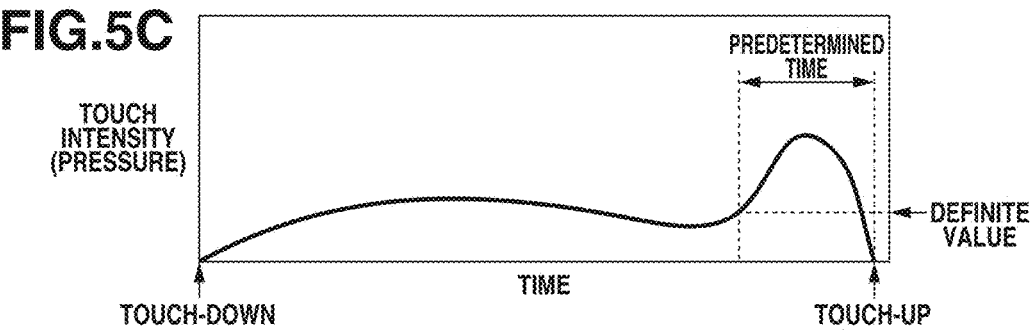

FIG. 5C illustrates a case where the touch intensity is increased immediately before the "touch-up" due to shaking, vibration of the apparatus, etc. In this case, a stable value before the increase is determined as the definite value.

Figure 5D:
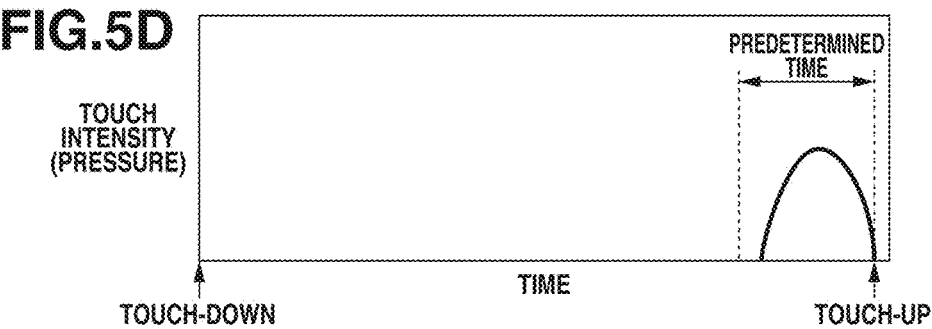

FIG. 5D illustrates a case where a period of the "touch-on" is shorter than the predetermined time. In this case, the touch intensity at the time point preceding the time point of occurrence of the "touch-up" by the predetermined time is not detected, so the definite value cannot be calculated.

As described above, with the method illustrated in FIGS. 5A to 5D, even if the intensity is excessively increased during a single-stroke touch operation by the user, the user can adjust the intensity to a weak value afterward and then perform the "touch-up" so that the user-intended weak value can be determined as the definite value. Especially, in the case where the intensity is erroneously increased for a short time due to a disturbance immediately before the "touch-up", as in the example illustrated in FIG. 5C, the user-intended value can be determined as the definite value without taking the increased touch intensity into consideration. In the case where the "touch-down" and the "touch-up" are erroneously performed within a short time, as in the example illustrated in FIG. 5D, an error is displayed to prevent application of the visual effect.

FIGS. 6A to 6D illustrate a method for determining as the definite value a maximum value of the touch intensity between the time point preceding the time point of occurrence of the "touch-up" by the predetermined time or by the predetermined number of times of detection/the predetermined number of detection cycles and the time point of occurrence of the "touch-up". In this case, in the examples illustrated in FIGS. 6A and 6B, the touch intensity takes the maximum value at the time point preceding the time point of occurrence of the "touch-up" by the predetermined time or by the predetermined number of times of detection/the predetermined number of detection cycles, so the same definite values as those in FIGS. 5A and 5B are respectively obtained.

In the example illustrated in FIG. 6C, the strong touch immediately before the "touch-up" is determined as the intended touch operation, and the maximum value within the stipulated time is determined as the definite value.

In a case where the period of the "touch-on" is shorter than the predetermined time, as in the example illustrated in FIG. 6D, the maximum value within the "touch-on" period is determined as the definite value instead of displaying an error indicating that calculation of a definite value is unsuccessful. Accordingly, in such a situation in which both a sensitive adjustment and an instantaneous operation are required, the method illustrated in FIGS. 6A to 6D is more suitable than the method illustrated in FIGS. 5A to 5D.

As described above, with the method illustrated in FIGS. 6A to 6D, even if the intensity is excessively increased during a single-stroke touch operation by the user, the user can adjust the intensity to a weak value afterward and then perform the "touch-up" so that the user-intended weak value can be determined as the definite value. Especially, in the case where the strong press is intentionally performed for a short time immediately before the "touch-up", as in the example illustrated in FIG. 6C, the strong touch intensity is taken into consideration in calculating the definite value. In the case where the "touch-down" and the "touch-up" are performed within a short time, e.g., a tap operation, as in the example illustrated in FIG. 6D, the user-intended value is determined as the definite value.

FIGS. 7A to 7D illustrate a method for determining the definite value based on the touch intensity within the most recent stable period from the time point of occurrence of the "touch-up". In this method, the CPU 102 searches for the stable period in which an amount of change in touch intensity or a slope (gradient) of the change is less than or equal to a threshold value and the touch intensity is detected for the predetermined time or longer or is detected a predetermined number of times or more/a predetermined number of detection cycles or more, and determines a mean value of the touch intensity during the stable period as the definite value. According to the method, even in a case where it is difficult to uniquely determine the predetermined time, as in a case of a mobile device or the like that is used under various external environments, a user intention is stably reflected.

FIGS. 7A and 7B illustrate examples of a case where the stable period exists immediately before the touch intensity is rapidly decreased. In this case, a definite value that is close to the definite value calculated by the methods illustrated in FIGS. 5A to 5D and 6A to 6D is consequently calculated.

In an example illustrated in FIG. 7C, a period in which the touch intensity is unstable exists immediately before the "touch-up", so the definite value of the touch intensity is calculated from a stable period that exists before the unstable period.

In a case where there is no stable period, as in an example illustrated in FIG. 7D, it can be determined that an error occurs or a maximum value of the touch intensity during the "touch-on" period can be determined as the definite value to avoid the error.

As described above, with the method discussed in FIGS. 7A to 7D, if the intensity is excessively increased during a single-stroke touch operation by the user, the user adjusts the intensity to a weak value afterward and then performs the "touch-up" so that the user-intended weak value can be determined as the definite value. Especially, in the case where the strong press is intentionally performed for a short time immediately before the "touch-up", the most stable touch intensity can be taken into consideration in calculating the definite value.

In any one of the above-described methods, the method for calculating the provisional value is similar to the method for calculating the definite value. Specifically, the definite value calculated by the similar method based on the assumption that the "touch-up" occurs at the moment at which the calculation of the provisional value is performed can be determined as the provisional value. In this way, a likely definite value in a case where the "touch-up" occurs immediately at this time point is specified as the provisional value, and an indefinite touch intensity during the "touch-up" transition is prevented from appearing as the provisional value. Alternatively, the method for calculating the provisional value can be different from the method for calculating the definite value, and a pressure detected at that time point (current time point) instead of the time point preceding the current time point by the predetermined time can be determined as the provisional value. In this way, a likely definite value in a case where the "touch-up" occurs immediately at this time point is specified as the provisional value with good responsiveness.

As described above, according to the present exemplary embodiment, the user can adjust the level of the visual effect by a simple procedure in which the touch intensity is adjusted at one point without a "touch-move". For example, both a point of interest and strength of the visual effect can be adjusted intuitively by a single-stroke operation based on the touch position and a touch intensity. The dialog occupies a smaller area of the GUI screen than a button operation, a slide bar, etc. for adjusting the intensity value, so even when the dialog is superimposed and displayed, the visual effect can be adjusted without impairing the visibility of the video image.

In the present exemplary embodiment, the video image to which the visual effect is applied based on the provisional value of the touch intensity is previewed (the preview is displayed) on the display 112. In this way, the user can determine a desired touch intensity while checking the visual effect, such as the feathering effect or the mosaic effect.

A second exemplary embodiment is described below. The second exemplary embodiment is applied to an operation to browse a search result using a web browser in an electronic apparatus that is a network terminal. An internal configuration of the electronic apparatus according to the present exemplary embodiment is similar to that in the first exemplary embodiment, so description thereof is omitted.

In the present exemplary embodiment, the CPU 102 reads a web browser program from the ROM 104, executes the web browser program, and displays on the display 112 a web page acquired from the network interface 110. When a user operates the touch panel 111 as a software keyboard cooperating with the web browser program, the CPU 102 acquires details of an operation and transmits a keyword to an external search engine site to perform a web page search.

Figure 8:
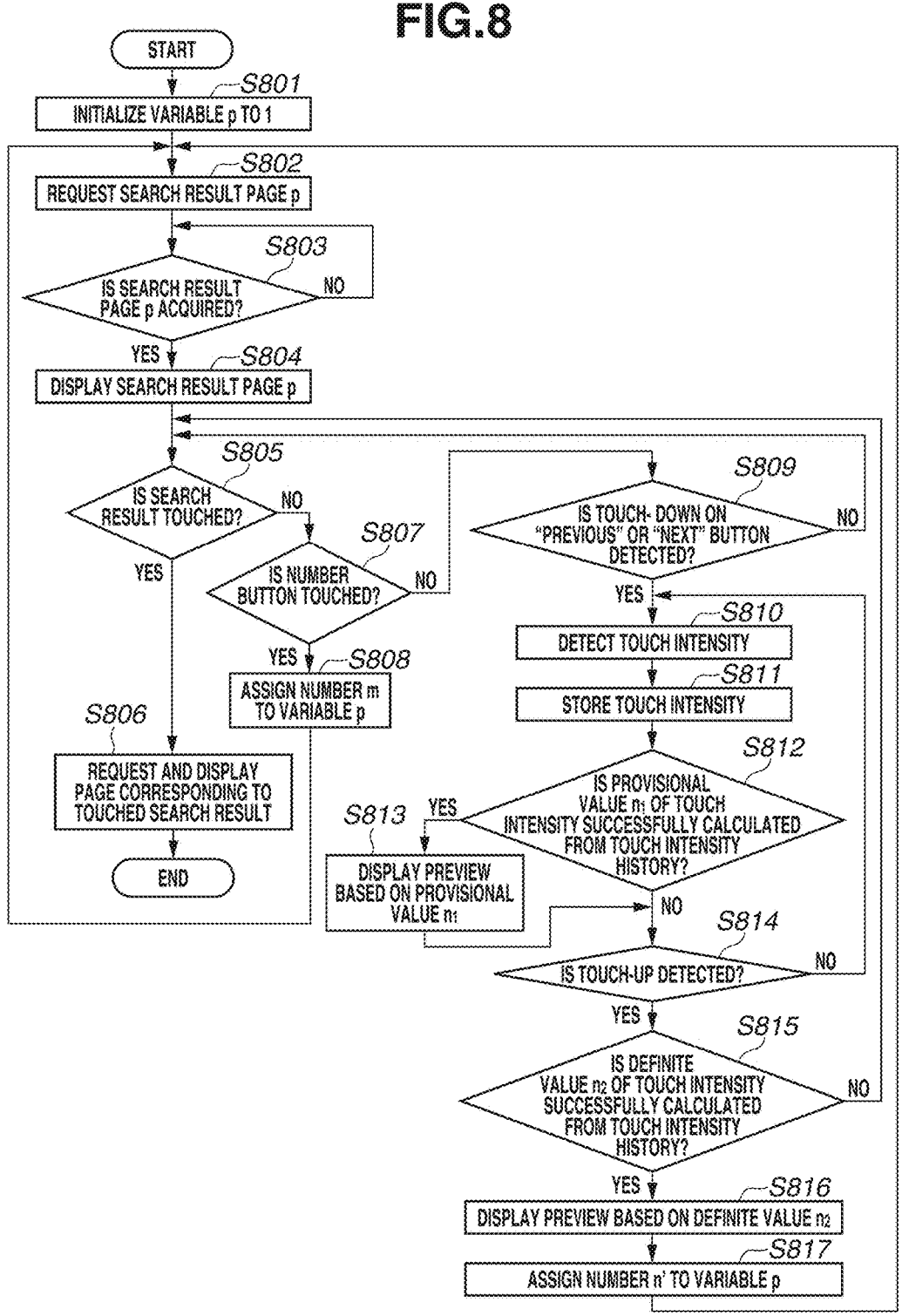
FIG. 8 is a flow chart illustrating an example of a process for performing search control based on a touch intensity according to a second exemplary embodiment.
Figure 9A:
FIGS. 9A to 9C each illustrate an example of a screen arrangement displayed on a display according to the second exemplary embodiment
Figure 9B:
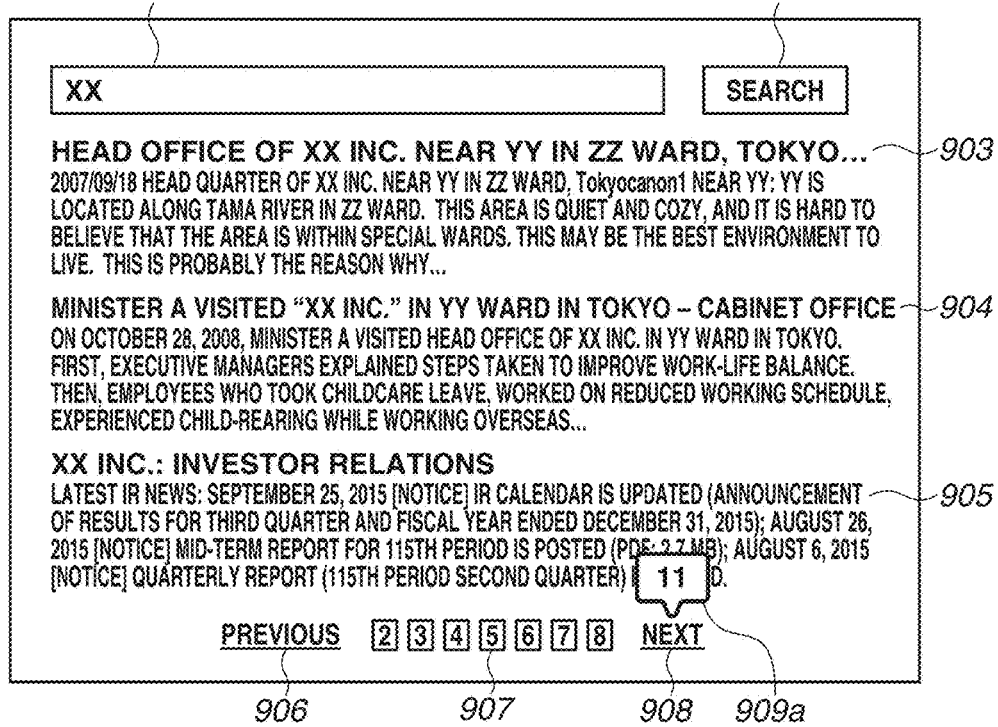
Figure 9C:

FIG. 8 is a flow chart illustrating an example of a process for controlling a search based on the touch intensity in the electronic apparatus 101 according to the present exemplary embodiment. The CPU 102 reads the program stored in the ROM 104 or the storage medium 113 into the RAM 103 and controls components of the electronic apparatus 101 to realize operations specified in the flow chart. The web browser program is already activated and the search keyword is already input by processing performed prior to the operations illustrated in the flow chart. FIGS. 9A to 9C illustrate an example of a page configuration in the web browser that is displayed on the display 112 by the process illustrated in FIG. 8, and will be described together with FIG. 8.

First, when the user inputs the search keyword via the touch panel 111 and the search is executed, the process is started. Then, in step S801, the CPU 102 initializes a variable "p" to one.

Next, in step S802, the CPU 102 transmits a request for a search result page "p" to the external search engine site via the network interface 110.

Then, in step S803, the CPU 102 stands by until the search result page "p" is acquired via the network interface 110 as a response to the request transmitted in step S802. If the CPU 102 acquires the search result page "p" (YES in step S803), then in step S804, the CPU 102 displays on the display 112 the search result page "p" acquired in step S803. FIG. 9A illustrates an example of the display.

In FIG. 9A, the search keyword for the current search result is displayed in a search keyword input form 901, and if a different search keyword is input and a search button 902 is pressed, a search is performed again. Items 903 to 905 are descriptions of contents of the search result. The search result can be four or more items simultaneously displayed. A "Previous" button 906 is a button corresponding to a previous page of the currently-displayed search result. Number buttons 907 are buttons respectively specifying page numbers of several previous and subsequent pages of the currently-displayed page. A "Next" button 908 is a button corresponding to a subsequent page of the currently-displayed search result.

In step S805, the CPU 102 determines whether a "touch-down" and a "touch-up" are detected at any one of the positions of the items 903 to 905 that are the search result. If the CPU 102 determines that a "touch-down" and a "touch-up" are detected at any one of the positions of the items 903 to 905 that are the search result (YES in step S805), the processing proceeds to step S806.

In step S806, the CPU 102 transmits to the external network a request for a page corresponding to the search result touched in step S805. Then, if the CPU 102 acquires the corresponding page, the CPU 102 displays the acquired page on the display 112, and the processing ends.

In step S805, if the CPU 102 determines that a "touch-down" and a "touch-up" are not detected at any one of the positions of the items 903 to 905, which are the search result (NO in step S805), the processing proceeds to step S807. In step S807, the CPU 102 determines whether a "touch-down" and a "touch-up" are detected at any one of the positions of the number buttons 907. If the CPU 102 determines that a "touch-down" and a "touch-up" are detected at any one of the positions of the number buttons 907 (YES in step S807), the processing proceeds to step S808.

In step S808, the CPU 102 assigns a number "m" of the corresponding number button to the variable "p". Then, the processing returns to step S802.

In step S807, if the CPU 102 determines that a "touch-down" and a "touch-up" are not detected at any one of the positions of the number buttons 907 (NO in step S807), the processing proceeds to step S809. In step S809, the CPU 102 determines whether a "touch-down" is detected at the position of the "Previous" button 906 or the "Next" button 908. If the CPU 102 determines that a "touch-down" is not detected at the positions of the "Previous" button 906 and the "Next" button 908 (NO in step S809), the processing returns to step S805.

In step S809, if the CPU 102 determines that a "touch-down" is detected at the position of the "Previous" button 906 or the "Next" button 908 (YES in step S809), the processing proceeds to step S810. In step S810, the pressure detection unit 114 detects the touch intensity after the "touch-down" from the touch panel 111.

Then, in step S811, the CPU 102 temporarily stores in the RAM 103 information about the touch intensity detected by the pressure detection unit 114 in step S810, and updates the touch intensity history.

Next, in step S812, the CPU 102 determines whether a provisional value "$n_1$" of the touch intensity is successfully calculated from the touch intensity history updated in step S811. The method for calculating the provisional value is similar to that in the first exemplary embodiment, and thus a detailed description is omitted. If the CPU 102 determines that the provisional value "$n_1$" of the touch intensity is successfully calculated (YES in step S812), the processing proceeds to step S813. If the CPU 102 determines that the provisional value "$n_1$" of the touch intensity is not successfully calculated (NO in step S812), the processing proceeds to step S814.

In step S813, the GPU 105 displays on the display 112 a preview based on the provisional value "$n_1$" calculated in step S812. FIG. 9B illustrates an example of the screen displayed in step S813 in the case where a "touch-down" operation is performed on the "Next" button 908 in step S809. In FIG. 9B, a pop-up 909a is a display indicating the page number of the destination of the move based on the provisional value "n" calculated in step S812, and the displayed contents are changed as steps S810 to S814 are repeated.

In the present exemplary embodiment, the number of pages to move forward or backward is determined based on the touch intensity detected by the pressure detection unit 114. For example, ranges are set using threshold values of several touch intensity levels, and the number of pages to jump over is determined according to the range to which the provisional value belongs.

In step S814, the CPU 102 determines whether a "touch-up" is detected after the detection of the "touch-down" in step S810. If the CPU 102 determines that a "touch-up" is detected (YES in step S814), the processing proceeds to step S815. If the CPU 102 determines that a "touch-up" is not detected (NO in step S814), the processing returns to step S810.

In step S815, the CPU 102 determines whether a definite value "$n_2$" of touch intensity is successfully calculated using a method similar to that in the first exemplary embodiment. If the CPU 102 determines that the definite value "$n_2$" of touch intensity is successfully calculated (YES in step S815), the processing proceeds to step S816. If the CPU 102 determines that the definite value "$n_2$" of touch intensity is not successfully calculated (NO in step S815), the processing returns to step S805.

In step S816, the GPU 105 displays on the display 112 a preview based on the definite value "$n_2$" calculated in step S815. FIG. 9C illustrates an example of the preview displayed in step S816. In FIG. 9C, a pop-up 909b is a display indicating the page number of the destination of the jump based on the definite value "$n_2$" calculated in step S815. In order to make it distinctive from the state of the provisional value, the pop-up 909b is displayed in a different form (color, shape, size, etc.) from the pop-up 909a illustrated in FIG. 9B.

Next, in step S817, the CPU 102 assigns to the variable "p" a page number "n'" of the destination of the move which is determined based on the definite value "$n_2$". Then, the processing returns to step S802.

As described above, according to the present exemplary embodiment, the user can jump from the displayed page to the desired page by a simple procedure in which the touch intensity is adjusted at one point without a "touch-move". The user can directly jump to and display a page outside the page range of the number buttons 907. The occupied area of the GUI screen is made smaller than that in a case of changing the page number of the destination of the jump using the number buttons 907, the slide bar, etc. Thus, by omitting the display elements, more search results or search results displayed in a larger size that are the main contents can be listed on the display 112.

The above-described various types of control performed by the CPU 102 can be performed by a single piece of hardware, or a plurality of pieces of hardware (e.g., a plurality of processors or circuits) can share the processing to control the entire apparatus.

While exemplary embodiments have been provided, it is to be understood that these exemplary embodiments are not limiting, and various modifications are applicable. Each of the above-described exemplary embodiments is a description of one exemplary embodiment, and the exemplary embodiments can be combined as appropriate.

While above-described exemplary embodiments are applied to the electronic apparatus, these examples are not seen to be limiting. An exemplary embodiment is also applicable to any display control apparatus that can receive touch input and detect a touch intensity, such as personal computers, personal digital assistants (PDAs), mobile phone terminals, mobile image viewers, printer apparatuses including a display, digital photo frames, music players, game machines, electronic book readers, etc.

Exemplary embodiment(s) can also be realized by one or more processors of a computer of a system or apparatus that read out and execute a program for realizing the functions of one or more of the above-described exemplary embodiments, which is supplied to the system or the apparatus via a network or a storage medium. Exemplary embodiment(s) can also be realized by a circuit (e.g., ASIC) that realizes the functions of one or more of the above-described exemplary embodiments.

An exemplary embodiment enables execution of user-intended processing in an apparatus that executes different processing according to a touch intensity in a case where the user adjusts the level of a contact intensity during a touch operation.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110042, filed Jun. 1, 2016, which is hereby incorporated by reference herein in its entirety.

What is claimed is:

1. An electronic apparatus comprising:
   a touch detector configured to detect a touch operation performed on an operation surface;
   a pressure detector configured to detect a pressing force applied to the operation surface; and
   a memory and at least one processor configured to perform operations of:
   a control unit configured to perform control in such a manner that, in a case where removal of a touch from the operation surface is detected by the touch detector, specific processing associated with a pressing operation applied to the operation surface is performed with strength based on the pressing force detected by the pressure detector at a time point preceding a time point of the detection of the removal of the touch by at least a predetermined time or a predetermined number of detection cycles of the pressure detector after the removal of the touch from the operation surface.

2. The electronic apparatus according to claim 1, further comprising a storage memory configured to store information about the pressing force detected by the pressure detector, wherein the control unit performs control in such a manner that the information about the pressing force detected by the pressure detector at the time point preceding the time point of the detection of the removal of the touch by the touch detector by at least the predetermined time or the predetermined number of detection cycles of the pressure detector is acquired from the storage memory to perform the specific processing based on the pressing force.

3. The electronic apparatus according to claim 1, wherein the memory and the at least one processor further function as a display control unit configured to perform control in such a manner that when the touch operation is detected by the touch detector and the pressing force is detected by the pressure detector, a display indicating the specific processing performed based on the pressing force detected by the pressure detector at a time point preceding a current time point by at least the predetermined time or the predetermined number of detection cycles of the pressure detector is displayed on a display unit.

4. The electronic apparatus according to claim 1, wherein the memory and the at least one processor further function as a display control unit configured to perform control in such a manner that when the touch operation is detected by the touch detector and the pressing force is detected by the pressure detector, a display indicating the specific processing performed based on the pressing force detected by the pressure detector at a current time point is displayed on a display unit.

5. The electronic apparatus according to claim 1, wherein in a case where the removal of the touch from the operation surface is detected by the touch detector, a confirmation screen for confirmation of the specific processing based on the pressing force detected by the pressure detector at the time point preceding the time point of the detection of the removal of the touch by at least the predetermined time or the predetermined number of detection cycles of the pressure detector is displayed on a display unit, and the control unit performs control in such a manner that the specific processing is performed in response to an execution instruction provided after the confirmation screen is displayed.

6. The electronic apparatus according to claim 1, wherein in a case where no pressing force is detected by the pressure detector at the time point preceding the time point of the detection of the removal of the touch by at least the predetermined time or the predetermined number of detection cycles of the pressure detector, an error is displayed on a display unit.

7. The electronic apparatus according to claim 1, wherein both of the predetermined time and the predetermined number of detection cycles are longer than a plurality of detection cycles of the pressing force applied to the operation surface by the pressure detector.

8. An electronic apparatus comprising:
a touch detector configured to detect a touch operation performed on an operation surface;
a pressure detector configured to detect a pressing force applied to the operation surface; and
a memory and at least one processor configured to perform operations of:
a control unit configured to perform control in such a manner that, in a case where removal of a touch from the operation surface is detected by the touch detector, specific processing associated with a pressing operation applied to the operation surface is performed with strength based on a maximum value of the pressing force detected by the pressure detector between a time point of the detection of the removal of the touch and a time point preceding the time point of the detection of the removal of the touch by at least a predetermined time or a predetermined number of detection cycles of the pressure detector after the removal of the touch from the operation surface.

9. The electronic apparatus according to claim 8, further comprising a storage memory configured to store information about the pressing force detected by the pressure detector, wherein the control unit performs control in such a manner that information about the maximum value of the pressing force detected cyclically by the pressure detector between the time point of the detection of the removal of the touch by the touch detector and the time point preceding the time point of the detection of the removal of the touch by the touch detector by at least the predetermined time or the predetermined number of detection cycles of the pressure detector is acquired from the storage memory and the specific processing is performed based on the maximum value of the pressing force.

10. The electronic apparatus according to claim 8, wherein the memory and the at least one processor further function as a display control unit configured to perform control in such a manner that when the touch operation is detected by the touch detector and the pressing force is detected by the pressure detector, a display indicating the specific processing performed based on the maximum value of the pressing force detected cyclically by the pressure detector between a current time point and a time point preceding the current time point by at least the predetermined time or the predetermined number of detection cycles of the pressure detector is displayed on a display unit.

11. The electronic apparatus according to claim 8, wherein the memory and the at least one processor further function as a display control unit configured to perform control in such a manner that when the touch operation is detected by the touch detector and the pressing force is detected by the pressure detector, a display indicating the specific processing performed based on the pressing force detected by the pressure detector at a current time point is displayed on a display unit.

12. The electronic apparatus according to claim 8, wherein in a case where the removal of the touch from the operation surface is detected by the touch detector, a confirmation screen for confirmation of the specific processing based on the maximum value of the pressing force detected by the pressure detector between the time point of the detection of the removal of the touch and the time point preceding the time point of the detection of the removal of the touch by at least the predetermined time or the predetermined number of detection cycles of the pressure detector is displayed on a display unit, and the control unit performs control in such a manner that the specific processing is performed in response to an execution instruction provided after the confirmation screen is displayed.

13. The electronic apparatus according to claim 8, wherein both of the predetermined time and the predetermined number of detection cycles are longer than a plurality of detection cycles of the pressing force applied to the operation surface by the pressure detector.

14. An electronic apparatus comprising:
a touch detector configured to detect a touch operation performed on an operation surface;
a pressure detector configured to detect a pressing force applied to the operation surface; and
a memory and at least one processor configured to perform operations of:
a search unit configured to search for a stable period in which an amount or gradient of change in the pressing force detected by the pressure detector is less than or equal to a threshold value and the pressing force is detected for a predetermined time or longer or a predetermined number of detection cycles or more; and
a control unit configured to perform control in such a manner that in a case where removal of a touch from the operation surface is detected by the touch detector, specific processing associated with a pressing operation is performed with strength based on the pressing force detected by the pressure detector during the stable period found by the search unit after the removal of the touch from the operation surface.

15. The electronic apparatus according to claim 14, wherein in a case where a plurality of stable periods is found by the search unit, the control unit performs control in such a manner that the specific processing is performed based on the pressing force detected by the pressure detector during a closest one of the plurality of stable periods found by the search unit to the time point of the detection of the removal of the touch by the touch detector.

16. The electronic apparatus according to claim 14, wherein the control unit performs control in such a manner that the specific processing is performed based on a mean value of the pressing force detected by the pressure detector during the stable period found by the search unit.

17. The electronic apparatus according to claim 14, further comprising a storage memory configured to store information about the pressing force detected by the pressure detector, wherein the search unit acquires from the storage memory the information about the pressing force detected by the pressure detector and searches for the stable period.

18. The electronic apparatus according to claim 14, wherein the memory and the at least one processor further function as a display control unit configured to perform control in such a manner that when the touch operation is detected by the touch detector and the pressing force is detected by the pressure detector, a display indicating the specific processing performed based on the pressing force detected by the pressure detector during the stable period found by the search unit is displayed on a display unit.

19. The electronic apparatus according to claim 14, wherein the memory and the at least one processor further function as a display control unit configured to perform control in such a manner that when the touch operation is detected by the touch detector and the pressing force is detected by the pressure detector, a display indicating the specific processing performed based on the pressing force detected by the pressure detector at a current time point is displayed on a display unit.

20. The electronic apparatus according to claim 14, wherein in a case where the removal of the touch from the operation surface is detected by the touch detector, a confirmation screen for confirmation of the specific processing based on the pressing force detected by the pressure detector during the stable period found by the search unit is displayed on a display unit, and the control unit performs control in such a manner that the specific processing is performed in response to an execution instruction provided after the confirmation screen is displayed.

21. The electronic apparatus according to claim 14, wherein in a case where no stable period is found by the search unit, the control unit performs control in such a manner that the specific processing is performed based on a maximum value of the pressing force detected cyclically by the pressure detector.

22. The electronic apparatus according to claim 14, wherein in a case where no stable period is found by the search unit, an error is displayed on a display unit.

23. The electronic apparatus according to claim 14, wherein both of the predetermined time and the predetermined number of detection cycles are longer than a plurality of detection cycles of the pressing force applied to the operation surface by the pressure detector.

24. A method for controlling an electronic apparatus, comprising:
detecting a touch operation performed on an operation surface;
detecting a pressing force applied to the operation surface; and
performing control in such a manner that, in a case where removal of a touch from the operation surface is detected, specific processing associated with a pressing operation applied to the operation surface is performed with strength based on the detected pressing force at a time point preceding a time point of detecting the removal of the touch by at least a predetermined time or a predetermined number of detection cycles of the detecting of the pressing force after the removal of the touch from the operation surface.

25. A method for controlling an electronic apparatus, comprising:
detecting a touch operation performed on an operation surface;
detecting a pressing force applied to the operation surface; and
performing control in such a manner that, in a case where removal of a touch from the operation surface is detected, specific processing associated with a pressing operation applied to the operation surface is performed with strength based on a maximum value of the detected pressing force between a time point of detecting the removal of the touch and a time point preceding the time point of detecting the removal of the touch by at least a predetermined time or a predetermined number of detection cycles of detecting of the pressing force after the removal of the touch from the operation surface.

26. A method for controlling an electronic apparatus, comprising:
detecting a touch operation performed on an operation surface;
detecting a pressing force applied to the operation surface;
searching for a stable period in which an amount or gradient of change in the detected pressing force is less than or equal to a threshold value and the pressing force is detected for a predetermined time or longer or a predetermined number of detection cycles or more; and
performing control in such a manner that in a case where removal of a touch from the operation surface is detected, specific processing associated with a pressing operation applied to the operation surface is performed with strength based on the detected pressing force detected during the stable period found by the searching after the removal of the touch from the operation surface.

27. A non-transitory computer-readable storage medium storing computer executable instructions for causing a computer to execute a method for controlling an electronic apparatus, the method comprising:
   detecting a touch operation performed on an operation surface;
   detecting a pressing force applied to the operation surface; and
   performing control in such a manner that, in a case where removal of a touch from the operation surface is detected, specific processing associated with a pressing operation applied to the operation surface is performed with strength based on the detected pressing force at a time point preceding a time point of detecting the removal of the touch by at least a predetermined time or a predetermined number of detection cycles of the detecting of the pressing force after the removal of the touch from the operation surface.

28. A non-transitory computer-readable storage medium storing computer executable instructions for causing a computer to execute a method for controlling an electronic apparatus, the method comprising:
   detecting a touch operation performed on an operation surface;
   detecting a pressing force applied to the operation surface; and
   performing control in such a manner that, in a case where removal of a touch from the operation surface is detected, specific processing associated with a pressing operation applied to the operation surface is performed with strength based on a maximum value of the detected pressing force between a time point of detecting the removal of the touch and a time point preceding the time point of detecting the removal of the touch by at least a predetermined time or a predetermined number of detection cycles of detecting of the pressing force after the removal of the touch from the operation surface.

29. A non-transitory computer-readable storage medium storing computer executable instructions for causing a computer to execute a method for controlling an electronic apparatus, the method comprising:
   detecting a touch operation performed on an operation surface;
   detecting a pressing force applied to the operation surface;
   searching for a stable period in which an amount or gradient of change in the detected pressing force is less than or equal to a threshold value and the pressing force is detected for a predetermined time or longer or a predetermined number of detection cycles or more; and
   performing control in such a manner that in a case where removal of a touch from the operation surface is detected, specific processing associated with a pressing operation applied to the operation surface is performed with strength based on the detected pressing force detected during the stable period found by the searching after the removal of the touch from the operation surface.

* * * * *